United States Patent
Rulkens et al.

(10) Patent No.: US 6,747,120 B2
(45) Date of Patent: Jun. 8, 2004

(54) COPOLYAMIDE BASED ON TETRAMETHYLENE TEREPHTHALAMIDE AND HEXAMETHYLENE TEREPHTHALAMIDE

(75) Inventors: Rudy Rulkens, Cadier en Keer (NL); Robert C. B. Crombach, Kerkrade (NL)

(73) Assignee: DSM IP Assets B.V., Heerlen (NL)

(*) Notice: Subject to any disclaimer, the term of this patent is extended or adjusted under 35 U.S.C. 154(b) by 0 days.

(21) Appl. No.: 10/109,055

(22) Filed: Mar. 29, 2002

(65) Prior Publication Data

US 2002/0183479 A1 Dec. 5, 2002

Related U.S. Application Data

(63) Continuation of application No. PCT/NL00/00675, filed on Sep. 21, 2000.

(30) Foreign Application Priority Data

Oct. 5, 1999 (NL) .............................................. 1013215

(51) Int. Cl.$^7$ .......................... C08G 69/02; C08G 69/28
(52) U.S. Cl. ........................ 528/310; 528/170; 528/322; 528/323; 528/332; 528/335; 528/336; 528/338; 528/339; 528/340; 528/347
(58) Field of Search ................................ 528/170, 310, 528/322, 323, 335, 336, 332, 338, 339–340, 347

(56) References Cited

U.S. PATENT DOCUMENTS

| | | | | |
|---|---|---|---|---|
| 4,868,280 A | * | 9/1989 | Gaymans ..................... | 528/339 |
| 5,030,709 A | | 7/1991 | Pipper et al. | |
| 5,336,754 A | * | 8/1994 | Lahary et al. .............. | 528/349 |
| 5,416,189 A | * | 5/1995 | Vandevijver et al. ....... | 528/347 |
| 6,297,345 B1 | * | 10/2001 | Okushita et al. ............ | 528/170 |

FOREIGN PATENT DOCUMENTS

| | | |
|---|---|---|
| EP | 0 372 627 | 6/1990 |
| EP | 0 388 942 | 9/1990 |
| EP | 0 393 548 | 10/1990 |
| JP | 59009214 | 1/1984 |
| JP | 61188421 | 8/1986 |
| NL | 7014810 | 12/1970 |
| WO | WO 98/40428 | 9/1998 |

OTHER PUBLICATIONS

R.J. Gaymans et al, J. Polymer Science; Polymer Chemistry Edition, 22, pp. 1373–1382, "Preparation and Some Properties of Nylon– 4,2".*
Patent Abstracts of Japan, vol. 8, No. 93, English Abstract of JP 59009214, Jan. 18, 1984.
Patent Abstracts of Japan, vol. 11, No. 13, English Abstract of JP 61188421, Aug. 22, 1986.

* cited by examiner

Primary Examiner—P. Hampton Hightower
(74) Attorney, Agent, or Firm—Pillsbury Winthrop LLP

(57) ABSTRACT

The invention relates to a semi-aromatic polyamide containing at least tetramethylene terephthalamide units and also hexamethylene terephthalamide units.

The copolyamide has a melting point higher than approximately 290° C., a high crystallinity and a good stability.

Preferably the copolyamide according to the invention contains approximately 30–75 mol % hexamethylene terephthalamide units and also approximately 0.01–20 mol % other units.

The invention also relates to a process for the preparation of a semi-aromatic copolyamide containing at least tetramethylene terephthalamide units and hexamethylene terephthalamide units, characterized in that, successively, a first polymerization is effected in the melt phase, followed by an post-polymerization of the low molar mass polymer thus obtained in the solid phase; and to compositions and products that contain said copolyamide.

15 Claims, No Drawings

COPOLYAMIDE BASED ON TETRAMETHYLENE TEREPHTHALAMIDE AND HEXAMETHYLENE TEREPHTHALAMIDE

This is a Continuation of International Application No. PCT/NL00/00675 filed Sep. 21, 2000 which designated the U.S. and was published in the English language. The entire contents of the PCT application are hereby incorporated in their entirety by reference.

The invention relates to a semi-aromatic polyamide that contains tetramethylene terephthalamide units. The invention also relates to a process for preparing a polyamide that contains at least tetramethylene terephthalamide units and to compositions and products containing said polyamide.

In the context of this application a 'semi-aromatic polyamide' is understood to be a polyamide homo- or copolymer that contains aromatic or semi-aromatic units derived from an aromatic dicarboxylic acid, an aromatic diamine or an aromatic aminocarboxylic acid, the content of said units being at least 50 mol %.

Polytetramethylene terephthalamide (or polyamide 4T, also referred to as nylon 4T, hereinafter abbreviated as PA 4T) is known from for example R. J. Gaymans et al., J.Polym.Sci., Polym.Chem.Ed., 22, 1373 (1984). PA 4T is a semi-aromatic, semi-crystalline polyamide with a melting point higher than about 430° C.

Semi-crystalline (co)polyamides are used in particular for moulded parts that are exposed to high temperatures for some time and which parts should then show high dimensional stability and high retention of mechanical properties. On account of increasingly stringent requirements in for example the automotive and electronics industries, there is a constant need for materials that are resistant to high temperatures, preferably a resistance to above approximately 290° C., and more preferably to above 300° C. Polymers that are suitable for such applications will need to have a melting point that is distinctly higher than approximately 290° C. and also a melt stability and crystallisation behaviour such that melt processing via known processes to form moulded parts with a high crystallinity and good mechanical properties is possible.

In the context of this application, 'high crystallinity' is understood to mean a minimum melting enthalpy value of 50 J/g (as derived from a 2nd heating curve obtained with differential scanning calorimetry (DSC) at a heating rate of 20° C./min). A high crystallinity presents advantages with respect to, for example, fast processing from the melt into moulded parts and with respect to properties like stiffness and dimensional stability, in particular at temperatures up to a little under the melting point.

A disadvantage of the semi-aromatic polyamide 4T is that it does not show the aforementioned combination of properties. Polyamide 4T has a melting point that is higher than its decomposition temperature, so PA 4T is not a melt-processable polymer, and is, therefore, not suitable for the production of moulded parts via for example an injection-moulding process.

The object of the present invention is to provide a melt-processable semi-aromatic polyamide based on PA 4T that does not show the aforementioned disadvantages, or shows them to a lesser extent.

This object is achieved with a semi-aromatic copolyamide that, in addition to tetramethylene terephthalamidetetramethylene terephthalamide units, also contains hexamethylene terephthalamide units.

It is known per se that the melting temperature of a semi-crystalline, semi-aromatic polyamide can be changed by turning it into a copolymer; see for example Chapter 6 in Polyamide, Kunststoff Handbuch 3/4, Becker/Braun (Eds), Hanser Verlag (Munchen), 1998, ISBN 3-446-16486-3. This textbook teaches that a monomer unit of a different polymer with a lower melting point is usually chosen to lower the melting point of a semi-crystalline polymer, and that a decrease in the melting point is generally accompanied by a substantial, or even complete, loss of crystallinity, in particular at higher comonomer contents (in the order of 30–70 mol %), unless an isomorphic monomer unit is used as the comonomer.

Most surprisingly it has been found that the copolyamide according to the invention nevertheless shows a high crystallinity, in spite of its relatively high non-isomorphic comonomer content. Also surprising is that the copolyamide according to the invention is melt-processable, whereas neither PA 4T nor PA 6T are melt-processable, because the melting points of these two polyamides, which are higher than approximately 430° C. and approximately 370° C., respectively, lie above their decomposition temperatures. Another advantage is high thermal stability of the copolyamide. Yet another advantage is low water absorption of the copolyamide according to the invention. The monomers of the polyamide according to the invention are moreover commercially available on an industrial scale at low costs.

The copolyamide according to invention preferably contains approximately 30–75 mol % hexamethylene terephthalamide units. The advantage of this is that it can then well be melt-processed without the mechanical properties decreasing too much at a high temperature. In the case of a copolyamide with a concentration of hexamethylene terephthalamide units that is lower or higher than the aforementioned values, the melting point will be too close to the melting points of PA 4T or PA 6T, respectively.

The copolyamide according to the invention optionally also contains units derived from at least one dicarboxylic acid other than terephthalic dicarboxylic acid and/or derived from at least one diamine other than tetramethylene diamine or hexamethylene diamine and/or derived from at least one aminocarboxylic acid or cyclic amide. Also monomers with higher functionalities may optionally also be added. Preferably the copolyamide contains approximately 0.01–20 mol % of the aforementioned units. An advantage of using such additional units is that the melting point can be lowered even further, so that an optimum compromise can be obtained between melt processability on the one hand and retention of crystallinity and mechanical properties on the other. Another advantage is achieved in that milder conditions can be chosen for preparation of the copolyamide. An additional advantage of using monomers, for example acids or amines, with higher functionalities, is that a polymer of higher viscosity can be obtained more readily. To prevent substantial crosslinking the content of such monomers is preferably 0.01–3 mol %. The nature and amounts of additional units can easily be determined by a person skilled in the art on the basis of experiments.

Suitable dicarboxylic acids are for example aromatic dicarboxylic acids or aliphatic dicarboxylic acids with 6 to 18 carbon atoms. Preferably the dicarboxylic acid is an aromatic dicarboxylic acid, for example isophthalic acid or naphthalene dicarboxylic acid. The advantage of this is good thermal stability of the copolyamide. More preferably isophthalic acid is chosen as the dicarboxylic acid. The additional advantage of this is a fairly substantial lowering of the melting point, while mechanical properties are retained.

Suitable diamines are for example linear or branched aliphatic diamines with 2 to 18 carbon atoms. Preferably a linear aliphatic diamine with 7 to 12 carbon atoms is chosen or a branched aliphatic diamine with 6 to 10 carbon atoms. More preferably 1,9-nonane diamine, 1,12-dodecane diamine, trimethylhexamethylene diamine or 2-methylpentamethylene diamine is chosen. The advantage of this choice is that a fairly substantial lowering of the melting point occurs at relatively small amounts of comonomer, while other properties are better retained. Another suitable diamine is for example 1,3-xylylene diamine.

Suitable aminocarboxylic acids or cyclic amides are for example aliphatic aminocarboxylic acids or cyclic amides with 4 to 18 carbon atoms. Preferably 1,11-aminoundecanoic acid, laurolactam or epsilon-caprolactam is chosen. More preferably epsilon-caprolactam is chosen.

A suitable monomer with higher functionality is for example bishexamethylene triamine.

The copolyamide according to the invention can be prepared in various ways known per se for the preparation of polyamides and copolymers thereof. Suitable processes are for example described in Polyamide, Kunststoff Handbuch 3/4, Hanser Verlag (Munchen), 1998, ISBN 3-446-16486-3. Preferably a melt phase process is used in which no (organic) solvents need to be recovered and purified. A disadvantage of reactions in the melt phase may however be the prolonged exposure of the copolyamide to a high temperature. Therefore, use is preferably made of the process in which a mixture of dicarboxylic acids, or esters or polyesters thereof, and diamines, to which mixture water and an excess amount of tetramethylene diamine are added, is polycondensed via the liquid phase to form a low molar mass copolyamide (with a relative viscosity of for example 1.03–1.80). Such a process is for example known from U.S. Pat. No. 5,550,208, EP-0393548-A and EP-0039524-A. This is followed by post-condensation in the solid phase under an inert gas, which may optionally contain steam, until a copolyamide of the desired molar mass and viscosity is obtained. The advantage of such a process is that the copolyamide is in the melt phase at high temperatures for only a short time, so that undesired side-reactions are minimised.

The invention also relates to a plastic composition that contains the copolyamide according to the invention, and optionally contains the usual additives, for example heat- and UV-stabilisers etc., colorants, processing aids, for example mould release agents and lubricants, agents for improving impact resistance, reinforcing fillers and flame retardants. This plastic composition containing the copolyamide may optionally also contain polymers other than polyamides.

The copolyamide or the plastic composition according to the invention is eminently suitable for forming products from the melt, for example by means of injection-moulding, extrusion, blow moulding and compression moulding. Products obtained by using the copolyamide or the plastic composition according to the invention are for example car parts, electric and electronic components, films and fibres.

The invention will be further elucidated with reference to the following examples, without however being limited thereto. A higher relative viscosity (higher than for example 2) can be obtained by choosing other conditions or a different process.

EXAMPLE I

Preparation of PA 4T/6T (50:50)

A mixture of 112.8 g of tetramethylene diamine (DSM N.V.), 145.3 g of hexamethylene diamine (Aldrich), 450 g of water and 411.2 g of terephthalic acid (Aldrich) was stirred in a 2.5 liter autoclave with heating and with distillative removal of water. After 30 minutes an 87 wt. % aqueous salt solution was obtained, while the temperature rose from 160° C. to 230° C. Then the autoclave was closed. Polymerisation was effected at a temperature of 230° C. for 20 minutes, during which the pressure rose to 2 MPa, after which the autoclave's contents were flashed and the solid product was cooled further under nitrogen.

The prepolymer thus obtained was subsequently post-condensed in the solid phase, first for several hours with gradual heating to 150° C. under a stream of nitrogen and then under a stream of nitrogen/water vapour (10/1 weight ratio) for 24 hours at 250° C. Then the polymer was cooled to room temperature.

The relative viscosity of the polymer obtained, as determined on a solution of 1 gram of polymer in 100 ml of 96% $H_2SO_4$ at 25° C., was 1.35.

EXAMPLE II

Preparation of PA 4T/6T (40:60)

In the same way as in Example I a mixture of 108.6 g of tetramethylene diamine (DSM N.V.), 209.2 g of hexamethylene diamine (Aldrich), 553 g of water and 498.4 g of terephthalic acid (Aldrich) was stirred in a 2.5 liter autoclave with heating so that an 88 wt. % aqueous salt solution was obtained after 30 minutes. In this process the temperature increased from 160° C. to 230° C. Then polymerisation was effected at a temperature of 230° C. for 20 minutes, during which the pressure rose to 2 MPa.

The prepolymer was subsequently post-condensed in the solid phase in the same way as in Example 1.

The relative viscosity of the polymer obtained was 1.35.

The copolyamide was found by $^{13}$C-NMR spectroscopy to be a random copolymer.

EXAMPLE III

Preparation of PA 4T/6T (30:70)

In the same way as in Example I a mixture of 67.7 g of tetramethylene diamine (DSM N.V.), 203.4 g of hexamethylene diamine (Aldrich), 459 g of water and 411.2 g of terephthalic acid (Aldrich) was stirred in a 2.5 liter autoclave with heating, so that an 85 wt. % aqueous salt solution was obtained after 30 minutes. In this process the temperature rose from 160° C. to 230° C. Then polymerisation was effected at a temperature of 240° C. for 15 minutes, during which the pressure rose to 2 MPa.

The prepolymer was subsequently post-condensed in the solid phase in the same way as in Example I.

The relative viscosity of the polymer obtained was 1.54.

EXAMPLE IV

Preparation of PA 4T/6T (40:60)

In a similar way as in Example I a mixture of 116.4 g of tetramethylene diamine (DSM N.V.), 209.2 g of hexamethylene diamine (Aldrich), 482 g of water, 239.2 g of terephthalic acid (Aldrich) and 299.8 g of dimethylterephthalate (Aldrich) was stirred in a 2.5 liter autoclave with distillative removal of water and methanol. After 30 minutes heating, an 88 wt. % aqueous salt solution was obtained. In this process the temperature rose from 160° C. to 230° C. Then polymerisation was effected at a temperature of 240° C. for 15 minutes, during which the pressure rose to 2 MPa.

The prepolymer was subsequently post-condensed in the solid phase in the same way as in Example I.

The relative viscosity of the polymer obtained was 1.58.

Thermal Characterisation of the Copolyamides

A Mettler Toledo Star System (DSC) was used to determine the melting temperature $T_m$ (peak value), the melting enthalpy $\Delta H_m$, the crystallisation temperature $T_c$ (peak value) and the crystallisation enthalpy $\Delta H_c$. The measurements were carried out using a heating and cooling rate of 20° C./min. in an $N_2$ atmosphere. A polyamide sample was successively heated to 380° C., cooled to 80° C. after 1 minute at 380° C. and subsequently heated to 380° C. again. The results are summarised in Table 1.

In the 1st heating curve a double melting peak was found, whereas in the 2nd heating curve a single, wide transition was observed.

The examples show that a copolyamide according to the invention, with a high comonomer content, has a melting point that is clearly higher than 300° C. and a high crystallinity.

TABLE 1

Results of DSC measurements of the copolyamides of Examples I–III

|  | 1st heating curve | | cooling curve | | 2nd heating curve | |
| --- | --- | --- | --- | --- | --- | --- |
|  | $T_m$ (° C.) | $\Delta H_m$ (J/g) | $T_c$ (° C.) | $\Delta H_c$ (J/g) | $T_m$ (° C.) | $\Delta H_m$ (J/g) |
| Ex. I | 321/346 | 115 | 321/305 | −65 | 343 | 70 |
| Ex. II | 313/335 | 96 | 300 | −57 | 331 | 74 |
| Ex. III | 319/348 | 112 | 315 | −78 | 346 | 90 |

What is claimed is:

1. A semi-aromatic polyamide consisting of
   (a) tetramethylene terephthalamide units,
   (b) hexamethylene terephthalamide units and, optionally,
   (c) additional units derived from at least one dicarboxylic acid other than terephthalic acid, and/or derived from at least one diamine other than tetramethylene diamine or hexamethylene diamine, and/or derived from at least one aminocarboxylic acid or cyclic amide, other than tetramethylene terephthalamide and hexamethylene terephthalamide,
   provided that the copolyamide contains at most 20% of the additional units (c).

2. Copolyamide according to claim 1, wherein no more than 3 mol % of said additional units (c) are present in the copolyamide.

3. Copolyamide according to claim 1, wherein the copolyamide contains about 30–75 mol % hexamethylene terephthalamide units.

4. Copolyamide according to claim 1, wherein the copolyamide contains about 30–75 mol % hexamethylene terephthalamide units.

5. Copolyamide according to claim 1, wherein the dicarboxylic acid is an aromatic dicarboxylic acid.

6. Copolyamide according to claim 1, wherein the dicarboxylic acid is isophthalic acid.

7. Copolyamide according to claim 1, wherein the diamine is an aliphatic diamine.

8. Copolyamide according to claims 1, wherein the aliphatic diamine is 1,12-dodecane diamine and/or 2-methylpentamethylene diamine.

9. Copolyamide according to claim 1, wherein the cyclic amide is epsilon-caprolactam.

10. Copolyamide according to claim 1, wherein the melting point peak value of the copolyamide is at least 331° C. and the melt enthalpy is at least 50 J/g, determined by DSC, carried out with a heating and cooling rate of 20° C./min, in the second heating rate.

11. Process for the preparation of a semi-aromatic copolyamide with a composition according to claim 1, which comprises, successively, first polymerizing the diacid or ester or polyester thereof and the diamine in the melt phase, resulting in a low-molecular polymer, thereafter post-polymerizing the low molar mass polymer thus obtained in the solid phase.

12. Plastic composition containing a semi-aromatic copolyamide as set forth in claim 1.

13. Plastic composition containing a semi-aromatic copolyamide obtained according to the process of claim 11.

14. Product containing a semi-aromatic copolyamide as set forth in claim 1.

15. Product containing a semi-aromatic copolyamide obtained according to the process of claim 11.

* * * * *